(12) United States Patent
Zhang et al.

(10) Patent No.: US 7,224,847 B2
(45) Date of Patent: May 29, 2007

(54) SYSTEM AND METHOD FOR REAL-TIME WHITEBOARD STREAMING

(75) Inventors: Zhengyou Zhang, Redmond, WA (US); Li-wei He, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 779 days.

(21) Appl. No.: 10/463,068

(22) Filed: Jun. 17, 2003

(65) Prior Publication Data

US 2004/0165768 A1 Aug. 26, 2004

Related U.S. Application Data

(60) Provisional application No. 60/449,683, filed on Feb. 24, 2003.

(51) Int. Cl.
*G06K 9/40* (2006.01)
(52) U.S. Cl. .................................................. 382/254
(58) Field of Classification Search ................ 382/156, 382/162, 164, 167, 173, 218, 224, 225, 254, 382/260–264, 274; 358/515, 518; 345/422, 345/600–604
See application file for complete search history.

(56) References Cited

U.S. PATENT DOCUMENTS

| 5,544,267 A * | 8/1996 | Mahoney et al. ............ 382/317 |
| 6,980,695 B2 * | 12/2005 | Mehrotra ..................... 382/244 |
| 7,136,062 B1 * | 11/2006 | Butler ......................... 345/422 |
| 2004/0042680 A1 * | 3/2004 | Saund ......................... 382/274 |
| 2004/0175035 A1 * | 9/2004 | Graham ....................... 382/173 |

OTHER PUBLICATIONS

Abowd, G.D. Classroom 2000: An experiment with the instrumentation of a living educational environment, *IBM Systems Journal*, Nov. 1999, 38(4), pp. 508-530.
Abowd, G.D., C.G. Atkeson, J.A. Brotherton, T. Enqvist, P. Gulley, and J. LeMon, Investigating the capture, integration and access problems of ubiquitous computing in an educational setting, *Proceedings of CHI '98*, May 1998, pp. 440-447.
Brotherton, J.A., and G.D. Abowd, Rooms take note: Room takes notes!, *AAAI Proceedings Template Graphics*, Visualization, and Usability Center, College of Computing, Georgia Institute of Technology, Atlanta, GA.
Brotherton, J.A., G.D. Abowd and K.N. Truong, Supporting capture and access interfaces for informal and opportunistic meetings, Georgia Technical Report, GIT-GVU-99-06 (1998).
Stifelman, L.J., Augmenting real-world objects: A paper-based audio notebook, *Proceedings of CHI '96*, ACM SIGCHI, Vancouver, Canada, pp. 199-200.
Stifelman, L.J., B. Arons, C. Schmandt, and E.A. Hulteen, VoiceNotes: A speech interface for a hand-held voice notetaker, *Proc. INTERCHI '93*, ACM, Apr. 24-29 1993, pp. 179-186.

* cited by examiner

*Primary Examiner*—Amir Alavi
(74) *Attorney, Agent, or Firm*—Lyon & Harr, LLP; Katrina A. Lyon

(57) ABSTRACT

A system and method for streaming whiteboard content to computing devices in a networked environment. The invention is an extension of whiteboard image generation technology to provide network-based collaboration of a target meeting. In one aspect, each networked client can receive audio content and whiteboard content (video images). In another aspect, each networked client can transmit audio content and annotation content which is displayed separately or generated on the whiteboard image. The streaming content is built on external collaboration frameworks.

53 Claims, 10 Drawing Sheets

SYSTEM AND METHOD FOR REAL-TIME WHITEBOARD STREAMING

This application claims priority under 35 U.S.C. Section 119(e)(1) of provisional application No. 60/449,683, filed Feb. 24, 2003.

BACKGROUND

1. Technical Field

This invention is directed toward a system and method for method for streaming whiteboard content to computing devices in a networked environment. More specifically, the invention is directed toward a system and method for sending a sequence of enhanced whiteboard images to one or more remote meeting participants in real-time to allow network-based collaboration for all meeting participants during a meeting

2. Background Art

Meetings constitute a large part of many workers' working time. Making more efficient use of this time spent in meetings and the time and money spent traveling to and from meetings translates into a big increase in productivity and large cost savings.

Many meeting scenarios use a whiteboard extensively for brainstorming sessions, lectures, project planning meetings, patent disclosures, and so on. Note-taking and copying what is written on the board often interferes with many participants' active contribution and involvement during these meetings. As a result, some efforts have been undertaken to capture whiteboard content in some automated fashion.

Every business depends on the free flow of information and ideas to improve their products and services. Effective collaboration between people both inside and outside an organization increases product quality, improves product or project development lead times, and reduces costs. However, effective collaboration is often difficult. One issue that hinders effective meetings is that often people are not physically co-located. Traveling to meetings can be very time-consuming when considering lengthy travel times, and can be expensive. For a two or three hour meeting people often will travel a day to the meeting and a day back, especially if the meeting is across country or located in another country or on another continent.

Hence, there exists a great need to improve the ease of having a meeting with many participants that are not physically co-located that allows such remote participants to participate in the meeting in real time and share their ideas.

SUMMARY

The invention is directed toward a system and method for streaming whiteboard content to computing devices in a networked environment. The invention, termed the Real-time Whiteboard Streaming system and method is an extension of whiteboard image generation technology to provide network-based collaboration during a meeting. In one embodiment of the invention, each networked client can receive audio content and enhanced whiteboard content (video images or a sequence of snapshot images) of the meeting. In another embodiment, each networked client can transmit audio content and annotation content that is displayed on a separate display from the actual whiteboard or is generated on the actual physical whiteboard itself. The streaming content is built on external collaboration frameworks, such as, for example, Microsoft® Corporation's, Windows Messenger and Net Meeting. An enhanced live video of the whiteboard is streamed to the personal computers (PCs) of remote meeting participants, and in turn; they can send back comments and annotations. The resulting system makes a natural collaborative tool for distributed meetings.

A typical scenario for this system involves a brainstorming session involving a number N of people gathered in one location, normally a typical meeting room, and M (typically 1 to 3) individuals (remote persons), each of which may be in their own offices or other remote locations.

The N people gather in a meeting room equipped with a whiteboard; a camera capturing the whiteboard content; a microphone device capturing meeting audio; a meeting server; a projector, television or other display, connected to the meeting server; and a loudspeaker, preferably mounted on the microphone device. Each of the M individuals sits in his or her own office or other remote location equipped with a desktop computer or notebook computer; a speaker; a microphone; and a network connection, which connects the remote person's computer to the meeting server.

The N people in the meeting room use the whiteboard as the collaborative space to share their ideas by drawing on the whiteboard. The whiteboard content is captured quickly, in virtually real time, and is shared with the remote persons by transferring enhanced images of the whiteboard to them over the network. The verbal discussion is captured by the microphone, and the audio, preferably with directional information (e.g., with audio tracking using an audio fingerprint), is also sent to the remote persons via this means.

The remote persons participate in the meeting through audio, which is played on the loudspeaker in the meeting room. The remote persons can also participate in the meeting by annotating a captured whiteboard frame, and the annotated whiteboard frame is shown on the display in the meeting room, and also on other remote persons' computer. Additionally, a signal such as a buzzer or some visual cue may be used to alert the meeting participants that a remote participant has provided input to the whiteboard content.

The whole meeting, including the annotations, may be archived for future viewing. The whiteboard and annotations are time-stamped, and are therefore synchronized with the audio.

As discussed previously, the remote participants can provide annotations and verbal comments on the whiteboard content. The display in the meeting room, which is different than the whiteboard itself, shows both the whiteboard content and the annotations. An alternative scenario is to project the annotations of the remote participants directly projected onto the actual whiteboard in the meeting room. The advantage of this scenario is that the remote participants actively participate in the development of whiteboard contents.

In the above scenarios, conventional PCs are used by the remote participants. However, the remote participants could alternately use Tablet PCs. Microsoft's® Tablet PC is a design for a fully-equipped personal computer that allows a user to take notes using natural handwriting on a stylus or digital pen-sensitive touch screen instead of requiring the use of a keyboard. The ink technology makes it much easier for the remote participants to make annotations—either public and/or private.

As discussed above, the Real-Time Whiteboard Streaming system and method has a server-based side and client-based side. In the following paragraphs these will be discussed in more detail.

The server-based side of the Real-Time Whiteboard Streaming system and method generally consists of four primary parts: 1) a classification procedure that classifies cells of an image sequence as background, foreground or stroke cells; 2) a dynamic whiteboard background initialization and update procedure that computes the whiteboard color without the foreground objects (such as people) and pen strokes; 3) an efficient real time procedure that enhances the whiteboard region in the input video sequence; and 4) an analysis procedure that extracts the newly appeared strokes on the whiteboard.

The system and method according to the invention initially acquires a series of snapshots or a live whiteboard video input composed of a real-time sequence of image frames of the whiteboard. This snapshot sequence or video is processed in real-time on a frame-by-frame basis.

The sequence of the whiteboard image frames, either snapshots or video, are input into a cell-based motion detection process. In this process each image frame in a given sequence of frames is divided into cells. Each corresponding cell location is compared over time to detect any changes in lighting or color. If there are significant lighting changes, the whiteboard color matching process action is performed, which will be discussed in further detail later. If there are no significant lighting changes, each of the cells of the video frame is classified as foreground, whiteboard background or stroke cells. In cell classification, the idea is to filter out portions of the image of a person or other object obstructing portions of the whiteboard, such that only the strokes of whiteboard content are visible on the whiteboard background.

Cell classification is also used to create a whiteboard video stream that is an enhanced live video stream with the whiteboard and foreground objects such as a person standing in front of the whiteboard displayed. Another data stream, a whiteboard and stroke only data stream, is also created wherein only the strokes on the whiteboard are displayed on the whiteboard in an enhanced manner without foreground objects.

To display an enhanced image that includes the whiteboard and the foreground objects, image enhancement is performed. In the image enhancement process, the whiteboard color is made more uniform and the stroke saturation of the whiteboard content (what is written on the whiteboard) is increased to make the strokes more vivid and legible.

Another output of the cell classification is the determination as to whether strokes have been added or subtracted from the whiteboard. In this process action, the Real-time Whiteboard Streaming system and method determines whether or not the stroke content in a cell increases or decreases (i.e., corresponding to additional writing or erasures of whiteboard content). If there are changes in the stroke content of a cell these changes to content are output to the whiteboard data stream.

Additionally, after cell classification, the system determines whether or not the whiteboard color model should be updated. The whiteboard color model update processing identifies gradual changes in the whiteboard color. For example, these minor changes in lighting conditions may be due to clouds passing in front of the sun or something casting a shadow on the whiteboard. If gradual lighting changes are identified the current whiteboard color model in the whiteboard color model database is updated.

As discussed previously, if significant light changes are noted in the cell-based motion detection process, the system and method according to the invention determines whether or not the noted light changes are embodied in a current whiteboard color model. If the new lighting condition corresponds to a whiteboard color model in the whiteboard color model database, this model is used for the subsequent cell classification. However, if the color model is not found a new color model is initialized or estimated and added to the whiteboard color model database.

The system and method according to the invention has many advantages. It allows remote meeting participants to actively participate in a meeting without the time and expense of traveling to a remote site. It provides a more legible version of a data stream of the whiteboard with foreground objects, as well as a more legible data stream of the whiteboard content without foreground objects.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings that form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
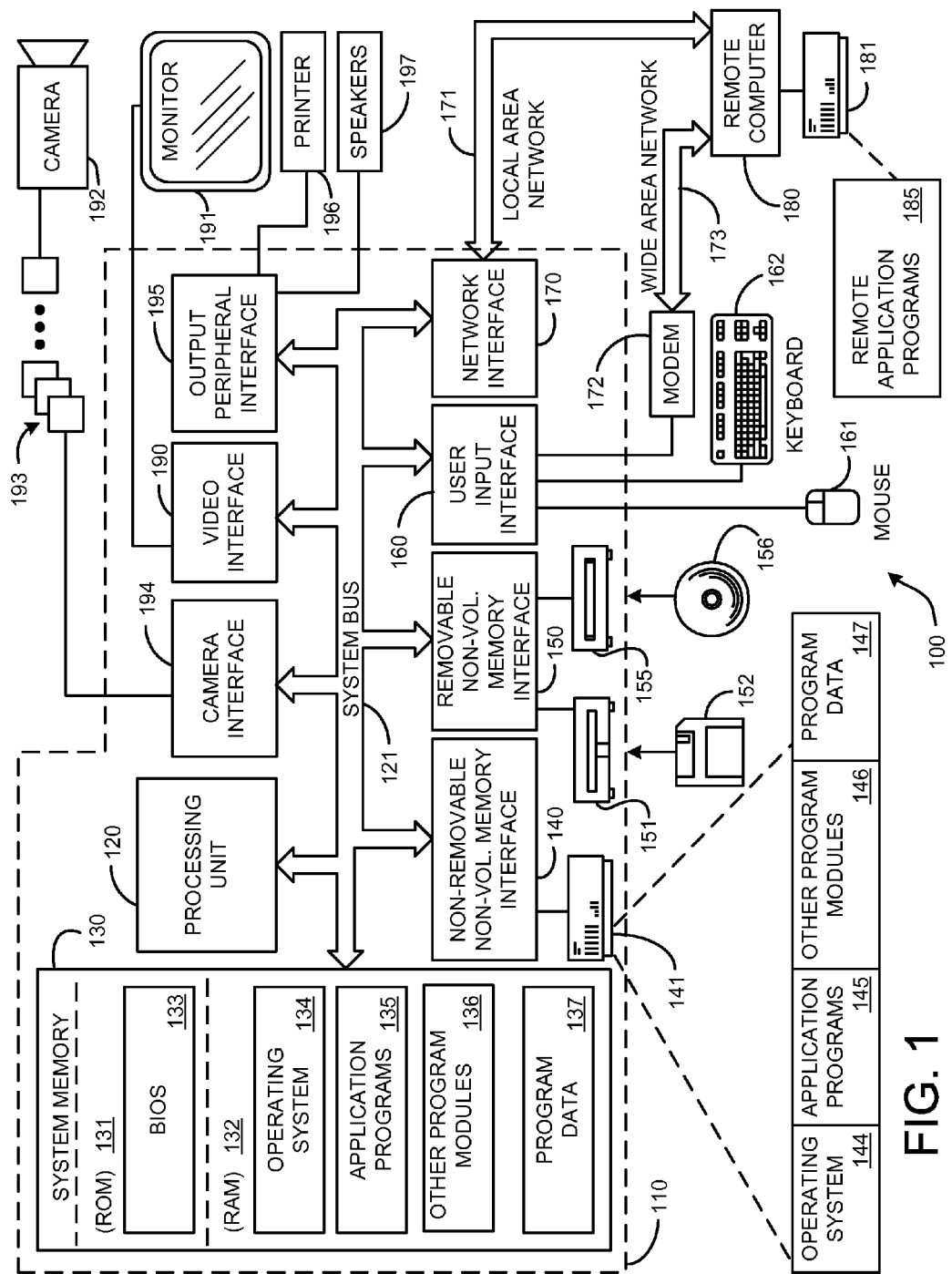
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through anon-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 192 (such as a digital/electronic still or video camera, or film/photographic scanner) capable of capturing a sequence of images 193 can also be included as an input device to the personal computer 110. Further, while just one camera is depicted, multiple cameras could be included as an input device to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 System and Method for Real—Time Whiteboard Streaming

2.1 General Overview

The Real-time Whiteboard Streaming system and method generally has a server-based component and can have one or more remote clients, arranged in a network-based environment. Enhanced live video or an enhanced real time sequence of snapshots of the whiteboard is streamed to the PCs of remote meeting participants, and in turn, they can send back annotations on the whiteboard content, as well as verbally commenting on the meeting proceedings.

Figure 2:
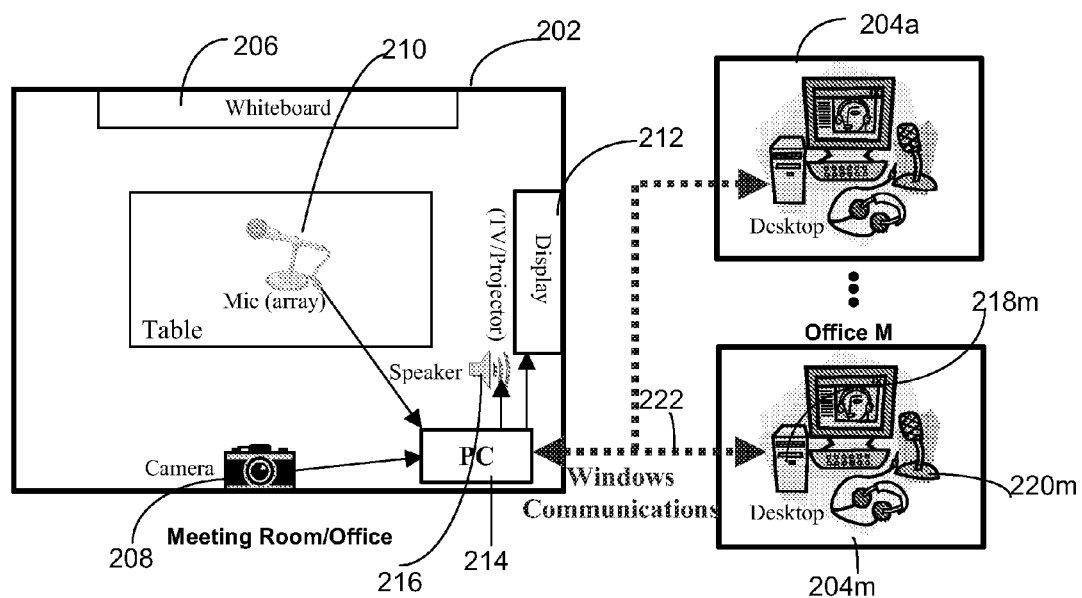
FIG. 2 is a diagram of the primary system components of the Real-time Whiteboard Streaming system and method.

As shown in FIG. 2, a typical scenario for this system involves a brainstorming session involving a number N people in one location such as a typical meeting room 202, and M (typically 1 to 3) remote persons 204a ... 204m each in their own offices or other remote locations.

The N people gather in a meeting room 202 equipped with a whiteboard 206; a camera capturing the whiteboard content 208; a microphone 210 capturing meeting audio; a meeting server; a projector, television or other display 212, connected to the meeting server 214; and a loudspeaker 216, preferably mounted on the microphone device. Each of the M individuals sits in his or her own office or other remote location 204a ... 204m equipped with a desktop or notebook computer 218; a speaker (not shown); a microphone/headset 220; and a network connection 222, which connects the remote person's computer 218 to the meeting server 214.

The N people in the meeting room 202 use the whiteboard 206 as the collaborative space to share their ideas by drawing on the whiteboard. The whiteboard content is captured quickly, and is shared with the remote persons by transferring enhanced whiteboard content to their computers 218a ... 218m. The verbal discussion is captured by the microphone 210, and the audio, preferably with directional information, is sent to the remote persons.

The remote persons participate in the meeting through audio, which is played on the loudspeaker 216 in the meeting room. The remote persons can also participate in the meeting by annotating a captured whiteboard frame, and the annotated whiteboard frame is shown on the display 212 in the meeting room, and also on other remote persons' computers 218a ... 218m. A signal, such as a beeper, buzzer or visual alert such as a flashing display can be used to alert the meeting participants that a remote participant has made an annotation.

2.2 Server-based Real-Time Whiteboard Streaming System and Method

Figure 3:
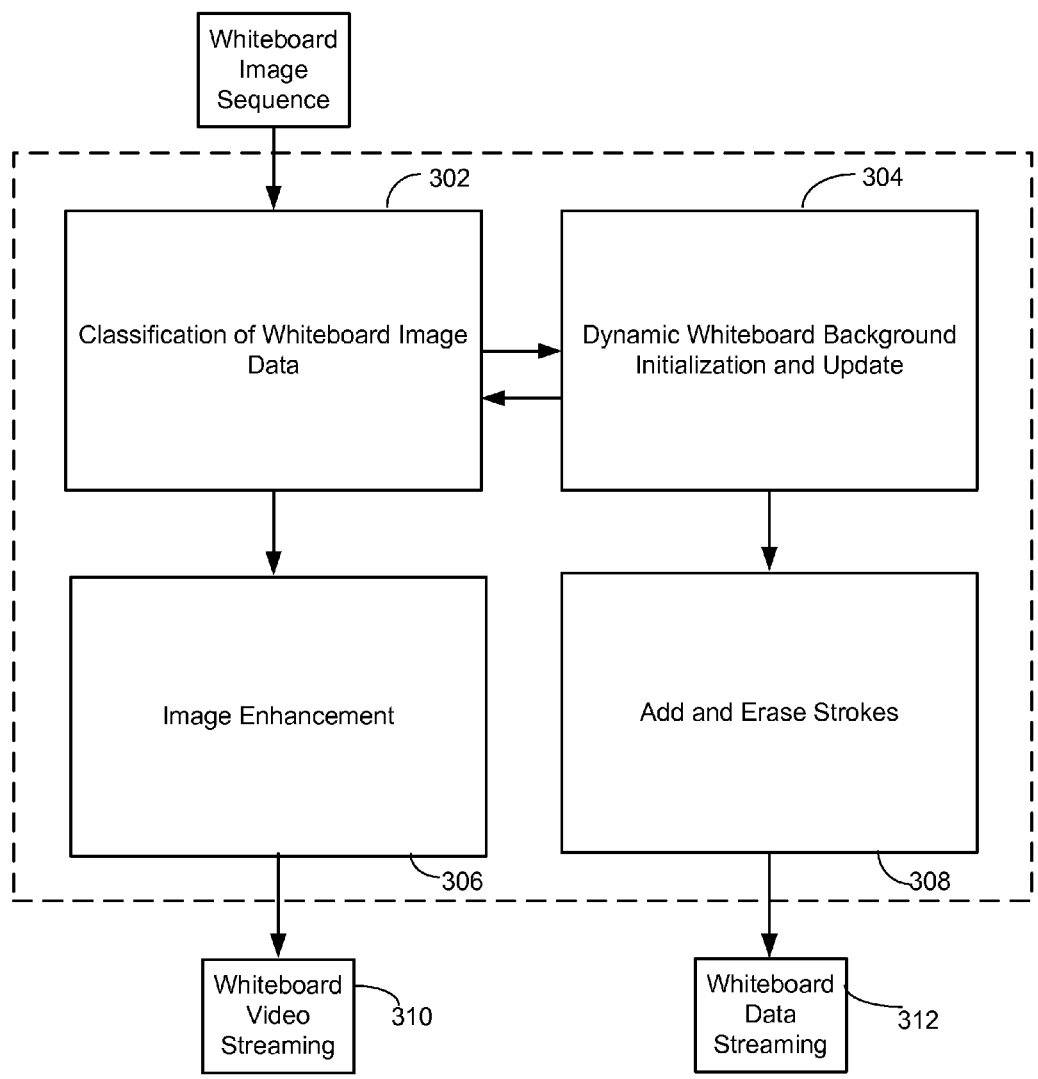
FIG. 3 is a diagram of the primary functional components of the Real-time Whiteboard Streaming system and method.

In general, as shown in FIG. 3, the Real-Time Whiteboard Streaming system and method functionally consists of four primary parts: 1) a classification procedure that classifies image cells of an image sequence as background, foreground or stroke cells (process action 302); 2) a dynamic whiteboard background initialization and update procedure that computes the whiteboard color without the foreground objects (such as people) and pen strokes (process action 304); 3) an efficient real time procedure that enhances the whiteboard region in the input image sequence (process action 306); and 4) an analysis procedure that extracts the newly appeared strokes on the whiteboard (process action 308). The output of the image enhancement procedure is an enhanced whiteboard image sequence (process action 310), while the output of the stroke analysis procedure is streaming whiteboard data only (process action 312).

Figure 4:
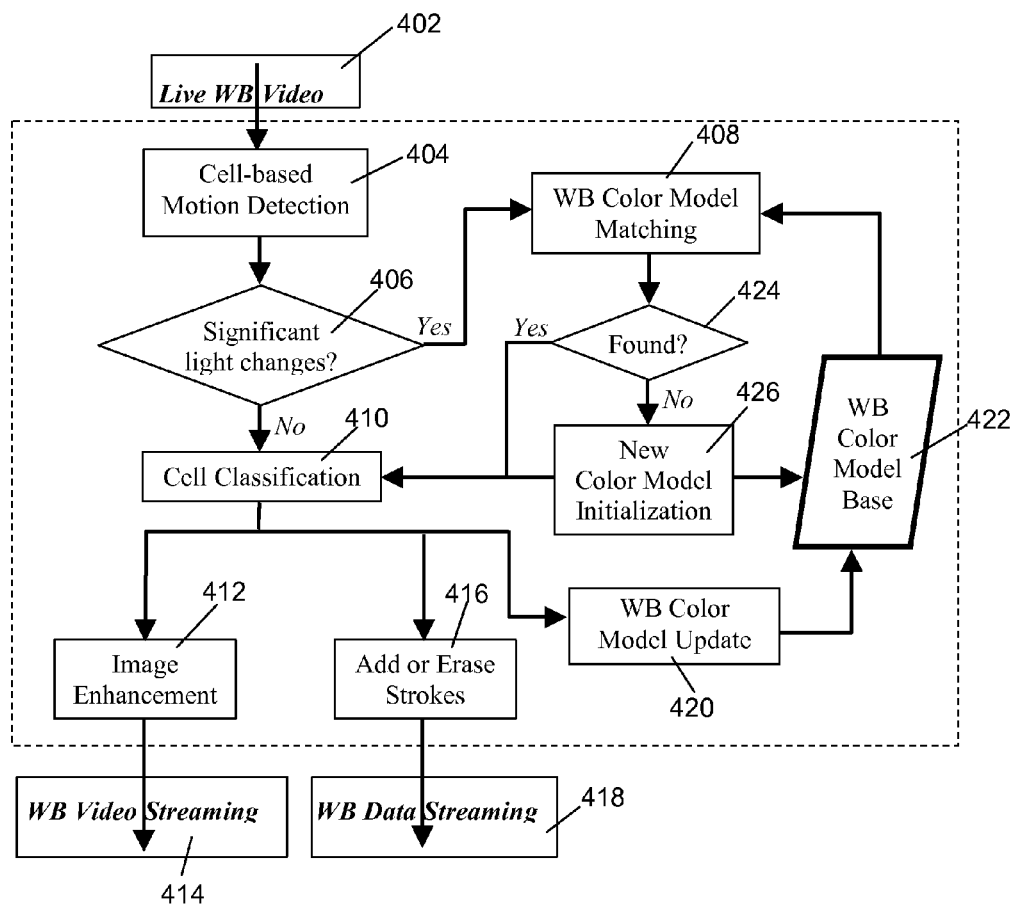
FIG. 4 is a general flow diagram of the system and method according to the invention.

More specifically, as shown in FIG. 4, the system and method according to the invention initially acquires a live whiteboard input composed of a real-time sequence of image frames of the whiteboard, as shown in process action 402. This video or sequence of snapshots or photographs is processed in real-time on a frame-by-frame basis.

A sequence of the whiteboard image frames are input into a cell-based motion detection process 404. In this process each image frame in a given sequence of frames is divided into cells. Each corresponding cell location is compared over time to detect any changes in lighting (process action 406). If there are significant lighting changes, the whiteboard color matching process action is performed (process action 408), which will be discussed in further detail later. If there are no significant lighting changes, each of the cells of the video frame are classified as foreground, whiteboard background or stroke cells (process action 410). In cell classification, the idea is to filter out portions of the image of a person or other object obstructing portions of the whiteboard, such that only the strokes of whiteboard content are visible on the whiteboard. Cell classification is also used to create a whiteboard image stream which is an enhanced live video or snapshot stream with the whiteboard and foreground objects such as a person standing in front of the whiteboard displayed, as shown in process action 414. The stream is enhanced via an enhancement procedure, as shown in process action 412. Another data stream, a whiteboard data stream, is also created wherein only the strokes on the whiteboard are displayed in an enhanced manner without foreground objects (process action 418), after stroke processing (process action 416) has been performed.

To display an enhanced image that includes the whiteboard and the foreground objects, image enhancement is performed as shown in process action 412. In the image enhancement (process action 412), the whiteboard color is made more uniform and the stroke saturation of the whiteboard content (what is written on the whiteboard) is increased to make the strokes more vivid and legible.

Another output of the cell classification is the determination as to whether strokes have been added or subtracted from the whiteboard, as shown in process action 416. In this process action, the Real-time Whiteboard Streaming system and method determines whether or not the stroke content in a cell increases or decreases. If there are changes in the stroke content of a cell this content is output to the whiteboard data stream (process action 418).

Additionally, as shown in process action 420, after cell classification the system determines whether or not the whiteboard color model should be updated. The whiteboard color model update processing identifies gradual changes in the whiteboard color due to, for example, minor changes in lighting conditions due to, for example, clouds passing in front of the sun or an object casting a shadow on the whiteboard. If changes are identified the current whiteboard color model in the whiteboard color model database 422, a database of all whiteboard color models available, is updated (process action 420).

As discussed previously, if significant light changes are noted (process action 406), the system and method according to the invention determines whether or not the noted light changes are embodied in a current whiteboard color model (process action 408). If the new lighting condition corresponds to a whiteboard color model in the whiteboard color model database (process action 424), this model is used for the subsequent cell classification. However, if the color model is not found a new color model is initialized (process action 426) and added to the whiteboard color model database.

The general system and method according to the invention having been described, the next paragraphs provide details of the aforementioned process actions.

2.2.1 Live Whiteboard Video or Snapshot Sequence Input.

Figure 5:
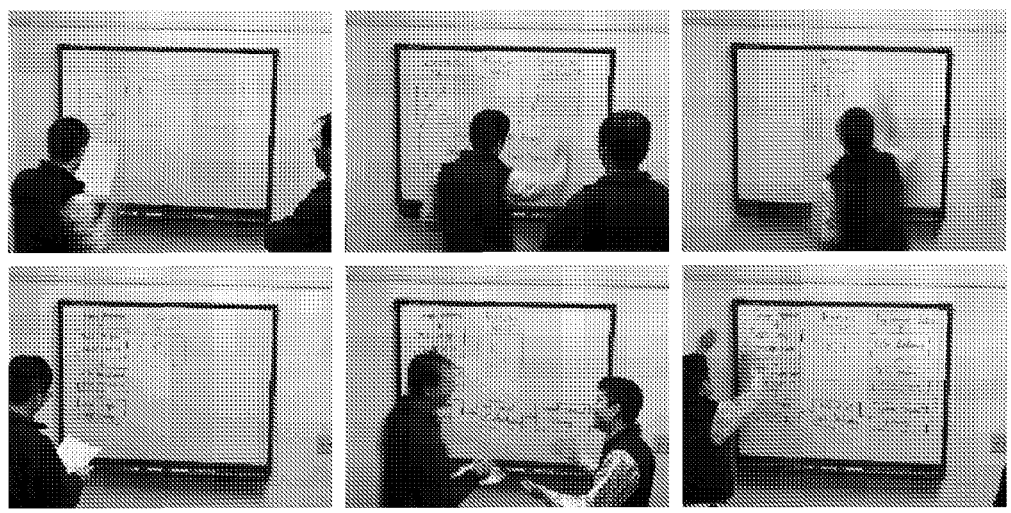
FIG. 5 is a diagram of a series of input images.

The system and method according to the invention initially acquires a live whiteboard video input or series of snapshots composed of a real-time sequence of image frames of the whiteboard. This video or snapshot series is processed essentially in real-time on a frame-by-frame basis. Some selected frames are shown in FIG. 5 from a sample video sequence. How many of the frames of a sequence are processed depends to some extent of the availability of the meeting server's 214 Central Processing Unit (CPU). Some, but not all, of the input frames are used for the subsequent whiteboard background color processing, based on CPU availability. The real-time processing of the foreground and stroke calculations and enhancement processing used to create the enhanced whiteboard video stream and whiteboard data stream take precedence over the whiteboard background calculations when the meeting server's processing bandwidth is constrained.

2.2.2 Cell-based Motion Detection and Cell Classification.

Cell classification identifies the cells as either 1) foreground; 2) the whiteboard background or 3) a stroke written on the whiteboard. The Real-Time Whiteboard Streaming system and method computes the blank whiteboard color from the input image sequence. The difficulty in this procedure is that the entire whiteboard may not be visible in any single frame, primarily due to obstructions in front of the whiteboard. Hence, the whiteboard background has to be constructed by first classifying the parts of the image frame as foreground or background. Only the background parts are used to compute the whiteboard background color.

In one working embodiment of the system and method according to the invention, the foreground/background decision is performed for image blocks of 16×16 pixels, called cells. In general, two primary heuristics are relied to perform the cell classification: 1) Since the camera and the whiteboard are stationary, the whiteboard background cells are stationary throughout the sequence; 2) Although there are sometimes foreground objects (e.g., a person standing in front of the whiteboard) obscuring the whiteboard, the cells that belong to the whiteboard background are typically the majority.

Figure 6:
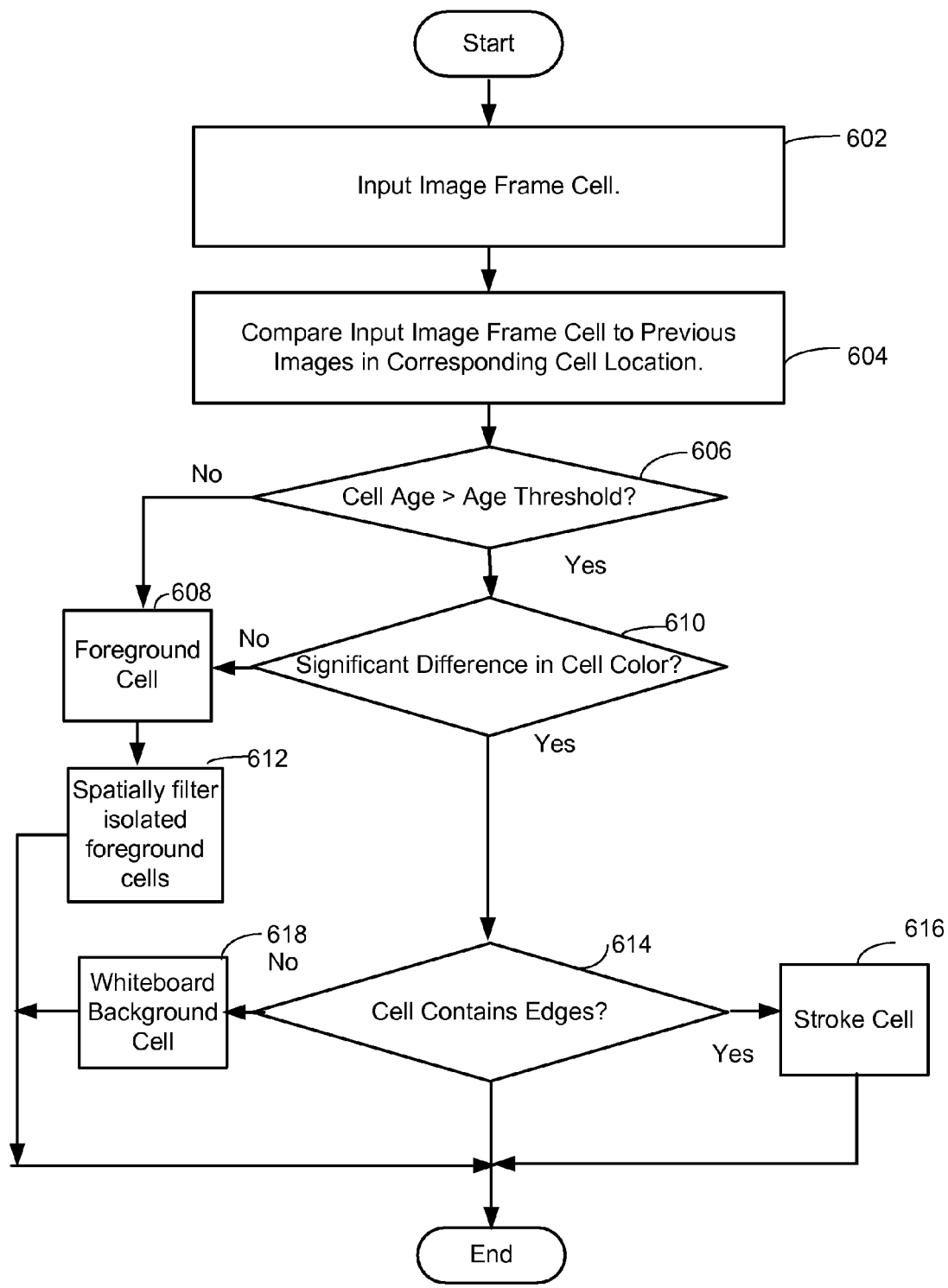
FIG. 6 is a general flow diagram of the cell classification of whiteboard image cells used by the system and method according to the invention.

Thus, in one embodiment of the invention, shown in FIG. 6, an image frame cell is input (process action 602). The image of a cell is compared against the image of the same cells (e.g., the cells in the same location) in previous frames, as shown in process action 604. At each frame, all the cells that have been stationary for more than N frames (4 in one working embodiment of the Real-time Whiteboard Streaming system and method) are considered to be the background candidates and fed to the Whiteboard Color Model Update module (process action 610). If the cell age is not greater than the age threshold (4 in one embodiment) the cell is classified as foreground cell, as shown in process action 608, and the age of the cell is reset to 1. If there is any significant difference in the cell color, the cell is classified as a foreground cell (process action 610). The difference test is that the Y, U, V channels of cell color have to be within 15, 5, and 5 intensity levels from their counterparts in the whiteboard color respectively. With respect to the foreground cells, to verify that these cells are not misclassified, an additional test is performed to determine whether cells are connected to other foreground cells (process action 612). If a group of foreground cells are isolated, their classifications are reverted and the classification process continues. The definition of isolation in one working embodiment of the invention is within a 5×5 cell neighborhood, there are less than 6 foreground cells. If the cell in question is not previously determined to be a foreground cell by the aforementioned tests, it is determined whether the cell contains edges, as shown in process action 614. If the cell does contain edges, it is designated as a stroke cell (process action 616). If the cell does not contain edges, it is classified as a whiteboard background cell (process action 618).

2.2.3 Whiteboard Color Estimation and Whiteboard Color Model Update.

The whiteboard color model update (process action 420) looks for gradual changes in the whiteboard background color. In the most general sense, the Real-time Whiteboard Streaming system and method tests to see if there is a gradual change by determining the average color of each of the cells. If the average color in the cells is almost the same as before, then it is determined that a gradual change has occurred. The system in one embodiment applies the same test as it does in determining whether the cell is a background cell or not. When such a gradual change is noted, an existing whiteboard color model is updated, instead of a new whiteboard color model being created. Only the color model for cells that are background cells or strokes are updated in the existing whiteboard color model. Foreground cells are not updated.

Figure 7:
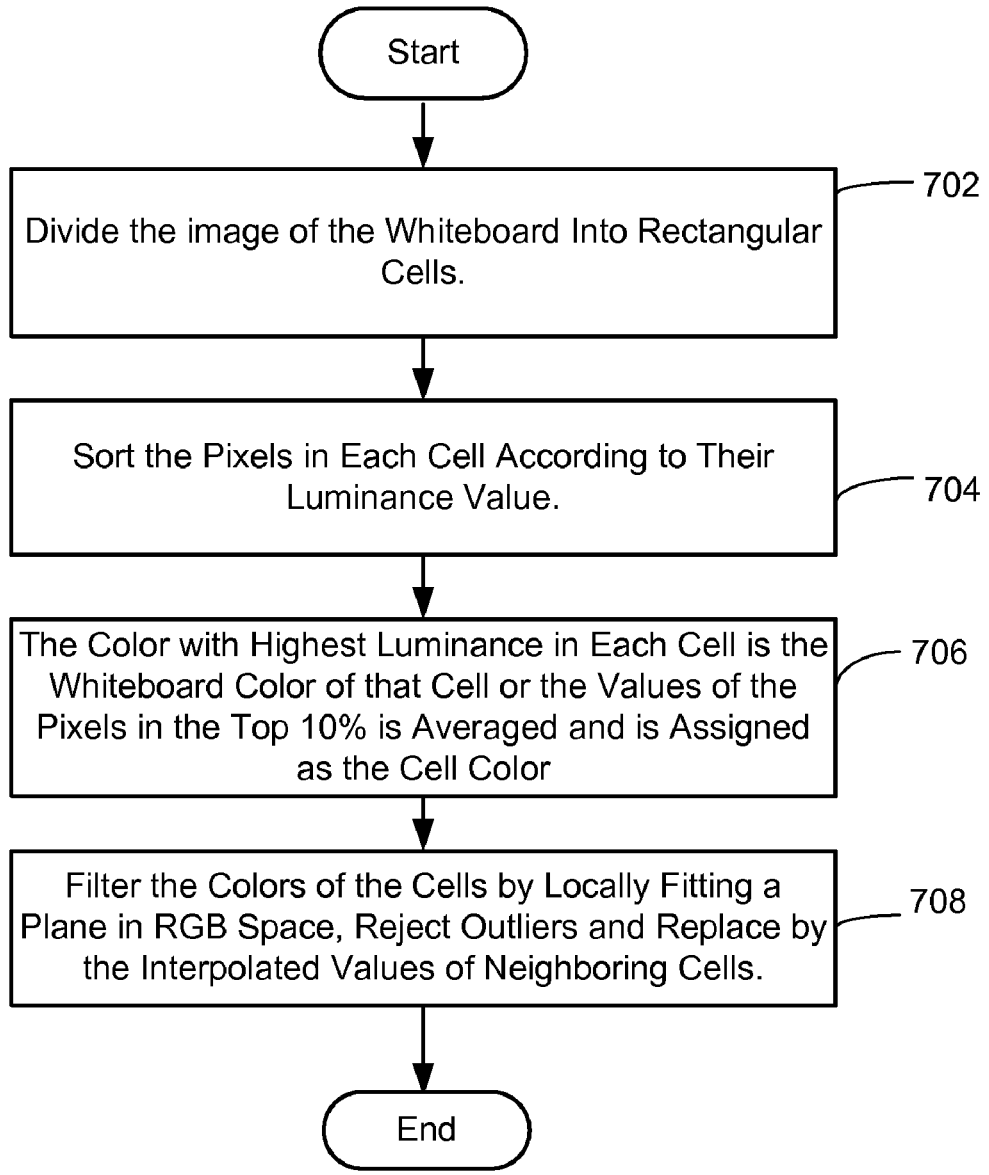
FIG. 7 is a general flow diagram of the whiteboard color estimation procedure used by the system and method according to the invention.

More specifically, as shown in FIG. 7, in one working embodiment of the invention the image of the whiteboard is divided into cells, as shown in process action 702. The cell size should preferably be roughly the same as what the size of a single character on the whiteboard is expected to be (in one working embodiment of the invention this was 16 by 16 pixels). Since the ink absorbs the incident light, the luminance of the whiteboard pixels is higher than pen stroke pixels. The whiteboard color within the cell is therefore the color with the highest luminance. In practice, the colors of the pixels in the top 10th percentile are averaged in order to reduce the error introduced by sensor noise. Hence, the color of each cell is computed by first sorting the (e.g. 16×16=256) pixels in brightness and then taking the average of the top 10% values, as shown in process action 706. The resulting cell colors are used as inputs to a least-median-square error algorithm, which fits a global plane over the colors and throws away the cells that contain outlier colors (the foreground colors), as shown in process action 708. The remaining cells are considered as background cells and their colors are used to update the whiteboard background. In order to fill the holes created by the cells that are obscured by foreground objects, the cells with known colors are also propagated to the neighboring cells without the colors. These remaining cell colors are integrated with the previously computed cell colors using the color estimation and filtering technique outlined in Appendix A.

To perform an update of the whiteboard color model the Real-time Whiteboard Streaming system and method takes a greater percentage of the original color model (e.g., 90%) and a smaller percentage of the new color for background or strokes (e.g. 10%).

2.2.4 Significant Lighting Changes.

As discussed above, significant lighting changes are considered (process action 406). For instance, if a light is turned off in the meeting room almost all of the cells in a given image of the whiteboard will change. If there is a significant lighting change, the cell-based motion detection (process action 404) will report that most of the cells are changed (e.g., 95% of the cells is the threshold used in one working embodiment of the invention to signify a significant change in the lighting). Then the whiteboard background is reset and a new color model is initialized or extracted from the whiteboard color model database. The procedure of cell classification and so on is then started over again.

2.2.5 Image Enhancement.

The goal of white balancing or color enhancement is to transform the input whiteboard image into an image with the same pen strokes on uniform background (usually white). For each pixel, the color value=$C_{light}$, the stroke pen color=$C_{pen}$, and the whiteboard background color=$C_{wb}$. Since the whiteboard is physically built to be uniformly colored, it can be assumed that $C_{wb}$ is constant for all the pixels. Hence, the lack of uniformity in the input image is due to different amounts of incident light to each pixel. Therefore, the first procedure in white balancing or color enhancement is to estimate $C_{light}$ for each pixel, the result of which is in fact an image of the blank whiteboard, as shown in FIG. 7, process action 702 and discussed previously under the section on whiteboard color estimation.

Figure 8:
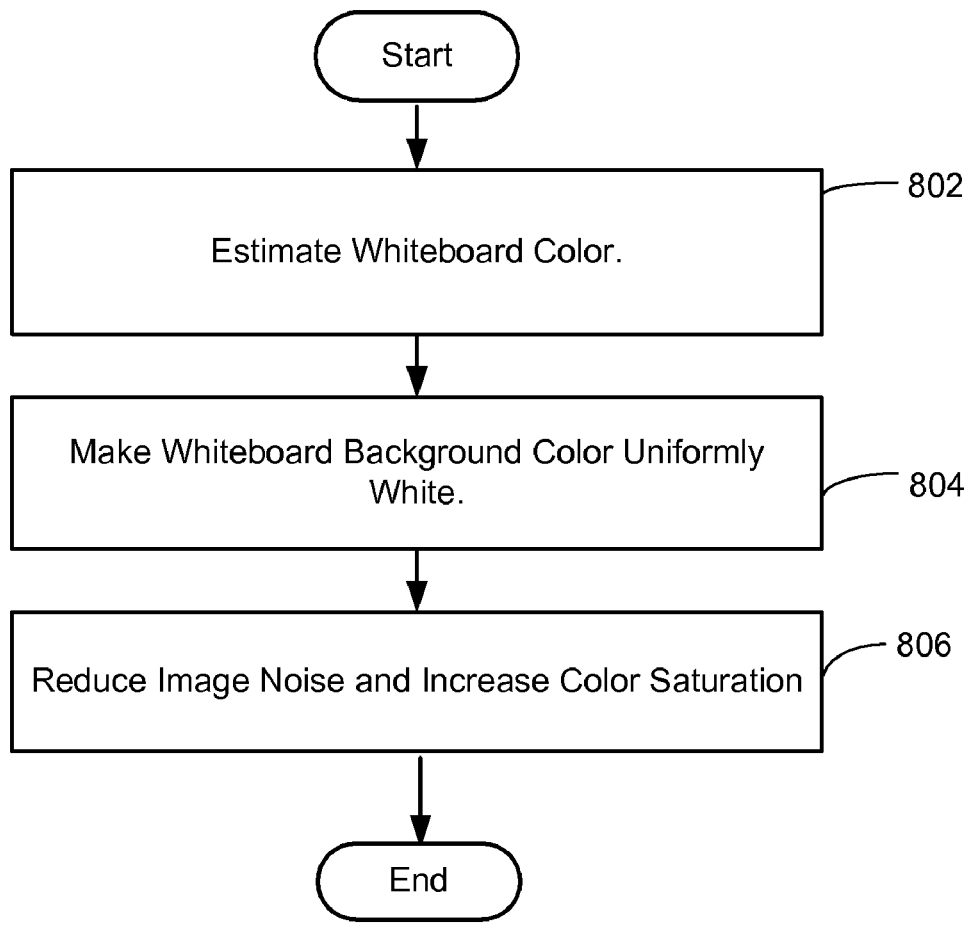
FIG. 8 is a general flow diagram of the whiteboard image enhancement of the system and method according to the invention.

Once the blank whiteboard color is calculated, it can be used to make the whiteboard region of the input video sequence uniformly white and the color of the pen strokes can be saturated as well. As shown in FIG. 8, once the image of the blank whiteboard is computed (process action 802), the input image is color enhanced in two steps:

1. Make the background uniformly white (process action 804). For each cell, the computed whiteboard color (equivalent to the incident light $C_{light}$) is used to scale the color of each pixel in the cell:

$$C_{out} = \min\left(1, \frac{C_{input}}{C_{light}}\right).$$

2. Reduce the image noise and increase the color saturation of the pen strokes. The value of each color channel of each pixel is remapped according to an S-shaped curve: $0.5-0.5 \cos(C_{out}^p \pi)$. The steepness of the S-curve is controlled by p. In one working embodiment of the invention, p is set to 0.75 (process action 806).

2.2.6 Stroke Identification and Extraction

Figure 9:
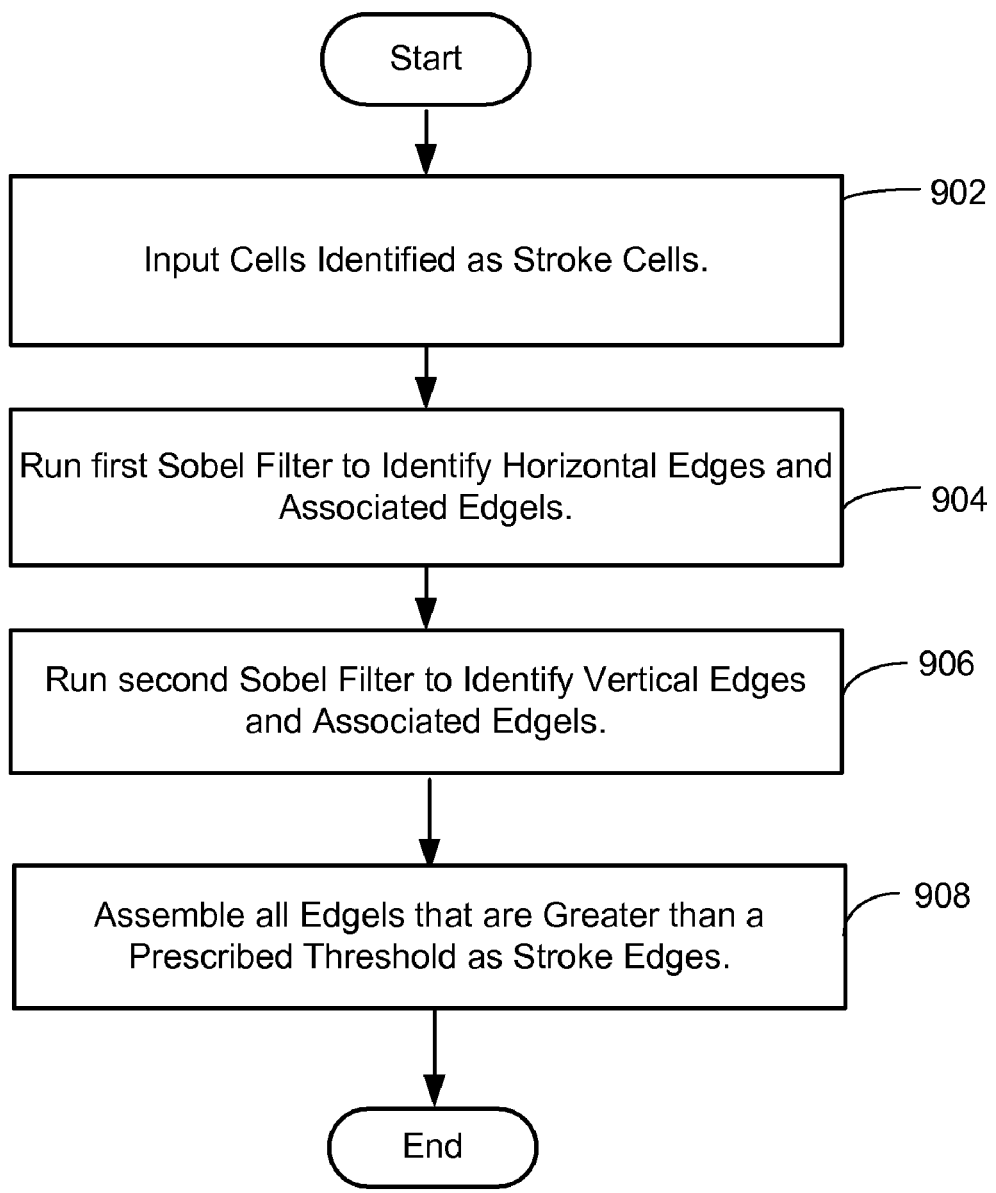
FIG. 9 is a general flow diagram of stroke identification and extraction of the system and method according to the invention.
Figure 10:
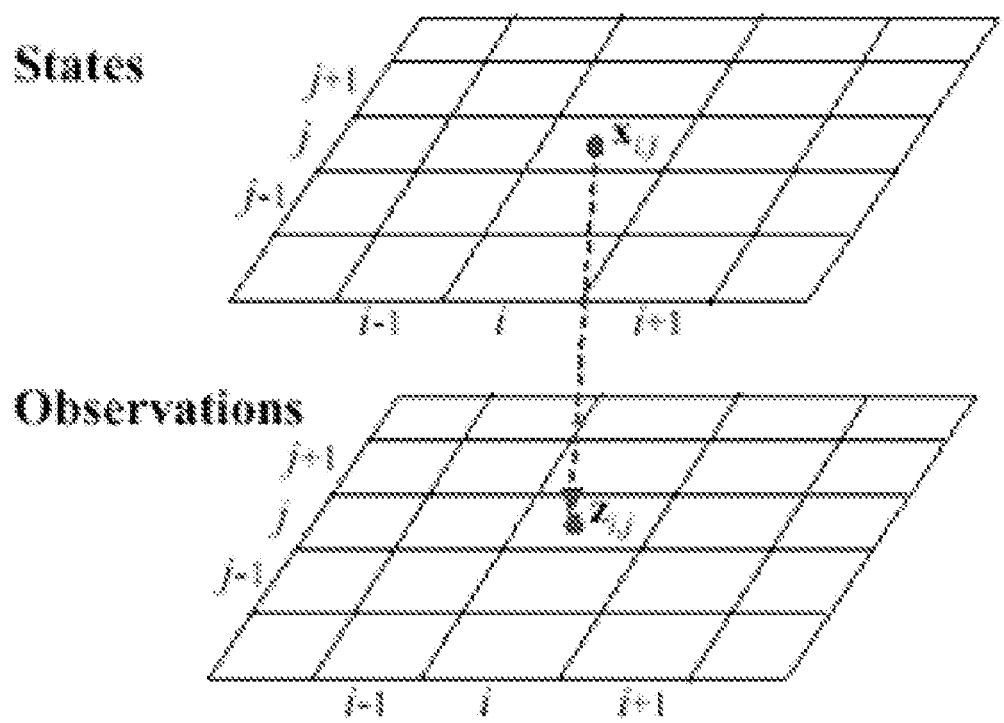
FIG. 10 is a diagram used to explain the whiteboard color estimation and filtering of the system and method according to the invention.

The strokes at the cell block level are also extracted to be output as the Whiteboard Data Stream. The strokes have the following properties: 1) they are stationary; 2) they have some edges. As shown in FIG. 9, in order to identify the edges and identify straight lines, two Sobel filters [−1 −2 −1; 0 0 0; 1 2 1] and [−1 0 1; −2 0 2; −1 0 1] are run on each incoming frame (process actions 902 to 906). The first Sobel filter is run to identify the horizontal edges, and the second Sobel filter is run to identify the vertical ones. This process identifies the edgels that exist in the input images. An edgel is defined to be the sum of the absolute values of the corresponding pixels in the two filtered images. For each cell, it has to be stationary for N frames (4 in one working embodiment of the present invention) and contain an edgel whose value is greater than a threshold (60 in one working embodiment of the present invention) to be considered a stroke cell. These edgels of the stroke cells define the edges of the stroke, as shown in process action 908.

2.2.7 Whiteboard Color Model Matching

When the system is started or a lighting change event is detected, N frames are acquired (e.g. 4 frames), and the color of cells that are stationary during the period are compared with each of the whiteboard background images in the database. If the stationary cells are all matched to the corresponding cell colors in one of the images in the database (using the YUV color model and 15,5,5 for difference test), then there is a match and the system proceeds to initialize the remaining non-stationary cells with the colors from the matched image. Once the background color updating procedure stabilizes, the matching is again performed against the database. If there is no match, the current color image is added to the database.

2.3 Client-based Real-Time Whiteboard Streaming System and Method

As discussed previously, the verbal discussion in the meeting room is captured by the microphone, and the audio, preferably with directional information, is sent to the remote persons. An enhanced whiteboard image stream and a whiteboard data stream is sent to the remote participants as discussed previously. The remote participants can chose to receive one or the other or both real time data streams.

The remote persons participate in the meeting through audio, which is played on the loudspeaker in the meeting room and by annotating a captured whiteboard frame. The remote participants annotations can, for example, consist of using a mouse, or other input device, to add text, circle items written on the whiteboard or draw figures or other markings. The annotations the remote participant makes are sent over the network to the meeting server using any suitable real-time communications protocol and displayed. Only the annotations, not the whole image of the whiteboard need to be sent to the meeting server since the whiteboard information is already resident. This is advantageous in that the network bandwidth required to send the annotation data is very small.

2.3.1 Annotation to a Separate Display.

The annotated whiteboard frame is shown on a display in the meeting room. This display is separate from the actual whiteboard in the meeting room, but contains the content of the whiteboard and the annotations of the remote participant. The annotations of a remote participant are also displayed on other remote persons' desktops. A signal, such as a buzzer or flashing screen draws the attention of the meeting participants and remote participants to the annotations a remote participant makes to the whiteboard.

2.3.2 Annotation Projected on Actual Whiteboard.

Alternately, the annotations of a remote participant can be displayed on the actual physical whiteboard in the meeting room. This can be done by projecting the annotations of the remote clients onto the actual whiteboard using a projector.

2.4 Annotation Using a Tablet PC.

In the above scenarios, conventional PCs are used by the remote participants. However, the remote participants could alternately use Tablet PCs. Microsoft's® Tablet PC is a design for a fully-equipped personal computer that allows a user to take notes using natural handwriting on a stylus or digital pen-sensitive touch screen instead of requiring the use of a keyboard. The ink technology makes it much easier for the remote participants to make annotations—either public and/or private.

2.5 Archiving

The whole meeting, including the annotations, may be archived for future viewing. The whiteboard and annotations are time-stamped, and are therefore synchronized with the audio. Thus, meeting participants can review the meeting at their leisure. Additionally, people who were unable to attend the meeting can view the meeting at a later date.

The foregoing description of the invention has been presented for the purposes of illustration and description. It is not intended to be exhaustive or to limit the invention to the precise form disclosed. Many modifications and variations are possible in light of the above teaching.

APPENDIX A

WHITEBOARD COLOR ESTIMATION

To fill in holes in the whiteboard color that occur when cells are classified as foreground cells, the following procedure is used to estimate the whiteboard color to fill in these holes. The procedure is based on two observations:

1) The whiteboard color usually changes from one cell to another, but not drastically. There is a smoothness or continuity to the whiteboard color.

2) Because lighting conditions typically do not change over short periods of time, the whiteboard color should remain the same if there is no foreground object.

The goal is to estimate the whiteboard color from a sequence of images with changing foreground but under constant or gradually varying light condition. (The case when the light condition changes abruptly such as one light is turned on or off is already addressed in section 2.2.4 by detecting the change and using multiple color models.) The assumption of constant or gradually varying light condition implies that the color of each whiteboard pixel can only change within a limited bound over time, and in one embodiment of the invention, this change is modeled as a random process with zero mean and small standard deviation. It is also assumed that the reflectance property of the whiteboard is similar in the neighboring pixels, which implies that the whiteboard color between neighboring pixels can only vary within a limited bound, and in one embodiment of the invention, this assumption is modeled as a Markov random field such that the whiteboard color at one pixel is only conditioned on the neighboring pixels. The estimation procedure consists of the following steps:

1. Initialization. The whiteboard color needs to be initialized. This can be done in several ways. One way is to use the technique estimates the whiteboard color from just one image by imposing the neighboring smoothness constraint. The color estimate at each pixel is associated with a covariance matrix which characterizes the accuracy of this estimate.

2. Color matching. Given an input image, the expected color of the whiteboard and the actual observed color is compared at each pixel. If they are very different, the observed pixel is a part of either a stroke or a foreground object, and the color of that pixel will be discarded in the next step; otherwise, the color of that pixel is an observation of the whiteboard color, and will be used in updating the whiteboard color.

3. Color updating. The valid whiteboard color pixels from the input image are used to update the whiteboard color under a probabilistic framework. How much the whiteboard color at each pixel is modified depends on how reliable the current observed pixel is with respect to the estimated color, how different the current observed pixel is from the estimated color, and how different the observed color is different from the colors in the neighboring pixels. The covariance matrix of the color estimate at each pixel is also updated accordingly.

Step 2 and step 3 are repeated for each input image.

In order to reduce the computational complexity and considering that the whiteboard color does indeed vary very slowly in space, the whiteboard region may be divided into a set of small cells, and each cell, rather than each pixel, can be considered in estimating the whiteboard color. More specifically, the mathematical details of estimating whiteboard color are described in the sections below.

A.1 Objective

The objective of this procedure is to estimate the whiteboard color dynamically from a sequence of images in real time. Here, it is assumed that lighting is almost constant across time. (When lighting changes abruptly, e.g., when one light is turned off, multiple whiteboard color models should be used.)

A.2 Representation

Referring to Figure A-1, the state variable $x_{i,j}$ is the color of the whiteboard at each cell $(i, j)$ to be estimated. The observation variable $z_{i,j}$ is the color of the whiteboard at each cell $(i, j)$ observed from an image, which can be computed by, for example, histogramming.

A.3 Problem Statement

Given:

- At time $t-1$, states: $\hat{x}_{i,j}^{t-1}$; covariance matrices: $\hat{P}_{i,j}^{t-1}$;

- State transition: $x_{i,j}^{t} = x_{i,j}^{t-1} + \eta_{i,j}^{t}$, i.e., constant with random variation $\eta_{i,j}^{t} \sim N(0, R_{i,j}^{t})$ (i.e., normal/Gaussian distribution centered at 0 with covariance matrix $R_{i,j}^{t}$);

- At time $t$, observations: $z_{i,j}^{t} = x_{i,j}^{t} + \zeta_{i,j}^{t}$, where observation noise $\zeta_{i,j}^{t} \sim N(0, Q_{i,j}^{t})$;

Estimate states at $t$: $\hat{x}_{i,j}^{t}$, and covariance matrices $\hat{P}_{i,j}^{t}$, under the constraint that $\hat{x}_{i,j}^{t}$ should vary smoothly spatially.

A.4 The Smoothness

One can use 4- or 8-neighbors to model the smoothness such that $$(x_{i,j}^{t} - x_{k,l}^{t}) \sim N(0, S_{i,j}^{t})$$

for $k \in [i-1, i+1]$ and $l \in [j-1, j+1]$ and $(k,l) \neq (i,j)$.

The predictions of states at $t$ are given by $$x_{i,j}^{t|t-1} = E[x_{i,j}^{t-1} + \eta_{i,j}^{t}] = \hat{x}_{i,j}^{t-1}$$

$$\hat{P}_{i,j}^{t|t-1} = V[x_{i,j}^{t-1} + \eta_{i,j}^{t}] = \hat{P}_{i,j}^{t-1} + R_{i,j}^{t}$$

A.4 Objective Function

The overall energy that one tries to minimize is then given by $$F = \sum_{i,j} \{(x_{i,j}^t - x_{i,j}^{t|t-1})^T (\hat{P}_{i,j}^{t|t-1})^{-1} (x_{i,j}^t - \hat{x}_{i,j}^{t|t-1}) + (x_{i,j}^t - z_{i,j}^t)^T (Q_{i,j}^t)^{-1} (x_{i,j}^t - z_{i,j}^t)$$

$$\frac{1}{\Omega} \sum_{(k,l) \neq (i,j)} \{(x_{i,j}^t - x_{k,l}^t)^T (S_{i,j}^t)^{-1} (x_{i,j}^t - x_{k,l}^t) + (x_{i,j}^t - z_{i,j}^t)\}$$

where $\Omega$ is the number of neighbors. The three terms are the differences from the prediction, the observation, and the neighbors, respectively. All of the differences are statistical distances, normalized by the covariance matrices.

A.6 Solution

Setting the partial derivative of $F$ with respect to $\hat{x}_{i,j}^t$ to 0 yields $$(\hat{P}_{i,j}^{t|t-1})^{-1}(x_{i,j}^t - \hat{x}_{i,j}^{t|t-1}) + (Q_{i,j}^t)^{-1}(x_{i,j}^t - z_{i,j}^t) + (S_{i,j}^t)^{-1}(x_{i,j}^t - \overline{x}_{i,j}^t) = 0$$

where $\overline{x}_{i,j}^t$ is the average of the states in the neighborhood, i.e., $$\overline{x}_{i,j}^t = \frac{1}{\Omega} \sum_{(k,l) \neq (i,j)} x_{k,l}^t$$

This gives the following solution:

$$x_{i,j}^t = ((\hat{P}_{i,j}^{t|t-1})^{-1} + (Q_{i,j}^t)^{-1} + (S_{i,j}^t)^{-1})^{-1} (\hat{P}_{i,j}^{t|t-1})^{-1} \hat{x}_{i,j}^{t|t-1} + (Q_{i,j}^t)^{-1} z_{i,j}^t + (S_{i,j}^t)^{-1} \overline{x}_{i,j}^t$$

Unfortunately, $\overline{x}_{i,j}^t$ on the right hand involves unknowns $x_{k,l}^t$. Therefore, to solve this interdependence problem, the following iterative procedure is employed: For the first iteration, the mean of the predictions is used, $\frac{1}{\Omega} \sum_{(k,l) \neq (i,j)} x_{k,l}^{t|t-1}$, as $\overline{x}_{i,j}^t$; and in the subsequent iterations, we use the mean of the estimates from the previous iteration. Note that this iterative procedure is very efficient since the only modification between iterations is $\bar{x}^t_{i,j}$; everything else can be cached. Similarly, the covariance of $x^t_{i,j}$ is given by $$P^t_{i,j} = ((\hat{P}^{t|t-1}_{i,j})^{-1} + (Q^t_{i,j})^{-1} + (S^t_{i,j})^{-1})^{-1})(2I + (S^t_{i,j})^{-1}\bar{P}^t_{i,j})$$

where I is the identity matrix, and $$\bar{P}^t_{i,j} = \frac{1}{\Omega} \sum_{(k,l) \neq (i,j)} P^t_{k,l}.$$

Again, an iterative procedure is used, with the mean of the predictions, $\frac{1}{\Omega} \sum_{(k,l) \neq (i,j)} \hat{P}^{t|t-1}_{k,l}$ as $\bar{P}^t_{i,j}$ in the first iteration.

A.7   Practical Considerations

In implementation, one should consider the following issues:

- Observation covariance $Q^t_{i,j}$. It should include both sensor noise and decision uncertainty. The decision uncertainty is the inverse of how much we believe $z^t_{i,j}$ is the whiteboard color. If this is an outlier, one sets $Q^t_{i,j} = \infty$ (a huge value).

- State transition noise $\eta^t_{i,j}$ and its covariance matrix $R^t_{i,j}$. This is used to account for small variation in lighting due to lamps or sunlight. (Large variation such as when a light is turned off should be taken care of by using multiple models.)

- Smoothness covariance matrix $S^t_{i,j}$. This should not be smaller than the sum of the current estimate of the covariance $\hat{P}^{t|t-1}_{k,l}$ and the expected variation in the ideal situation. If the expected variation is 5 intensity levels in each color channel, one can use $S^t_{i,j} = \hat{P}^{t|t-1}_{k,l} + 5^2 I$.

Wherefore, what is claimed is:

1. A computer-implemented process for creating an enhanced data stream of whiteboard content, comprising the process actions of:
- inputting a sequence of image frames of a whiteboard;
- dividing each of said image frames of said whiteboard into cells;
- determining if there are significant lighting changes in said cells in said sequence of images;
  - if there are significant lighting changes, performing a whiteboard color matching process to determine if the color of the whiteboard reflects a color of the whiteboard in a whiteboard color model database, said whiteboard color being used to define the whiteboard background color;
  - if there are no significant lighting changes, classifying each of the cells of the image frames as foreground, whiteboard background or stroke cells of content written on the whiteboard;
  - enhancing the sequence of image frames so that the strokes on the whiteboard are displayed in an enhanced manner using said cell classification; and
  - outputting a sequence of enhanced image frames of said whiteboard in a data stream.

2. The computer-implemented process of claim 1 wherein the process action of enhancing the sequence of image frames so that the strokes on the whiteboard are displayed in an enhanced manner comprises the process actions of:
- making the whiteboard background color for cells displaying whiteboard background in said sequence of image frames more uniform;
- reducing image noise in said sequence of image frames; and
- increasing the stroke saturation of the whiteboard content to make the strokes more vivid and legible for stroke cells.

3. The computer-implemented process of claim 1 wherein the process action of outputting a sequence of enhanced image frames of said whiteboard in a data stream comprises using only enhanced whiteboard cells and enhanced stroke cells, and no foreground cells.

4. The computer-implemented process of claim 1 wherein the process action of outputting a sequence of enhanced image frames of said whiteboard in a data stream comprises using enhanced whiteboard cells, enhanced stroke cells and foreground cells.

5. The computer-implemented process of claim 1, wherein said whiteboard color matching process action comprises:
- determining whether or not the color of the whiteboard background cells in the new lighting condition match a whiteboard color model in a whiteboard color model database;
- if the color of the whiteboard background cells in the new lighting condition corresponds to a whiteboard color model reflecting the color of the whiteboard background cells in said whiteboard color model database, using this whiteboard color model for subsequent cell classification;
- if the color of the whiteboard background cell in the new lighting condition is not found is said whiteboard color model database, creating a new whiteboard color model reflecting the color of the whiteboard background cells of the whiteboard in the new lighting condition.

6. The computer-implemented process of claim 5 further comprising the process action of:
- adding said new whiteboard color model to the whiteboard color model database.

7. The computer-implemented process of claim 1 further comprising the process action of determining if strokes have been added or subtracted from the whiteboard.

8. The computer-implemented process of claim 7 wherein the process action of determining whether strokes have been added or subtracted comprises the process action of determining whether or not the stroke content in each cell increases or decreases compared to correspondingly located cells in said sequence of image frames.

9. The computer-implemented process of claim 7 further comprising the process action of outputting a cell if there are changes in said cell to said sequence of enhanced images by displaying only enhanced stroke cells and enhanced whiteboard background cells and no foreground cells.

10. The computer-implemented process of claim 9 wherein enhanced whiteboard and enhanced stroke cells are output in said sequence of enhanced images until it is determined that strokes have been added or subtracted, and wherein the enhanced stroke cells corresponding to the strokes that have been added or subtracted are then output when changes to stroke content occur.

11. The computer-implemented process of claim 1 wherein the process action of classifying each of the cells of the image frames as foreground, whiteboard background or stroke cells of content written on the whiteboard, comprises the following process actions:
- for all image frame cells in an image frame in said sequence of images,
  - inputting an image frame's cell;
  - comparing said image frame's cell against the cells in the corresponding location in previous frames;
  - if the cell age based on the number of frames that the cell is unchanged is not greater than an age threshold, classifying the cell as a foreground cell;
  - if the cell age is greater than an age threshold, determining if there is any significant difference in cell color,
  - if there is not any significant difference in cell color, classifying the cell as a foreground cell;
  - if there is significant difference in cell color, determining whether said cell contains edges;
    - if said cell does contain edges, classifying said cell as a stroke cell; and
    - if said cell does not contain edges, classifying said cell as a whiteboard background cell.

12. The computer-implemented process of claim 11 further comprising the process action of verifying that said cell classified as a foreground cell is a foreground cell, comprising the process actions of:
- determining whether said foreground cell is connected to other foreground cells; and
- if a cell is determined to be a foreground cell and not connected to other cells, reverting its classification to unknown.

13. The computer-implemented process of claim 11 wherein the process action of determining if there is any significant difference in cell color, comprises the process action of:
- examining the Y, U, V channels of the cell;
- if the Y, U, V channels of said cell color are not within 15, 5, and 5 intensity levels from the correspondingly located cells in said whiteboard color model respectively, specifying that there is a significant difference in cell color.

14. The computer-implemented process of claim 12 wherein a foreground cell is not connected to other foreground cells if in a 5×5 cell neighborhood, there are less than 6 foreground cells.

15. The computer-implemented process of 12 wherein the process action of determining whether a cell contains edges comprises the process actions of:
for each frame's cells,
running a Sobel filter to identify horizontal edges in said cell to obtain a first filtered Sobel image;
running a Sobel filter to identify vertical edges in said cell to obtain a second filtered Sobel image;
determining the number of edgels that exist in each frame wherein an edgel is defined to be the sum of the absolute values of the corresponding pixels in the two Sobel filtered images;
for each cell, that is stationary for N frames, wherein a cell is stationary from successive frames N to N+1 when all pixels in the cell of frame N and N+1 are the same,
and contains an edgel number whose value is greater than a prescribed threshold,
considering it to be a stroke cell.

16. The computer-implemented process of 15 wherein all the pixels in a cell of frame N and N+1 are the same if the average absolute difference of all pixels is below a prescribed threshold.

17. The computer-implemented process of claim 16 wherein the prescribed threshold is defined in terms of an intensity level.

18. The computer-implemented process of claim 15 wherein said edgels in said stroke cells define the edges of the stroke.

19. The computer-implemented process of claim 1 further comprising a process action of determining whether a whiteboard background color model should be updated after the process action of classifying each of the cells of the image frames as foreground, whiteboard background or stroke cells of content written on the whiteboard.

20. The computer-implemented process of claim 19 wherein the process action of determining whether the whiteboard background color model should be updated comprises the process actions of:
identifying any gradual changes in the whiteboard color by examining the average color of the corresponding cells in the past sequence of image frames leading up to the current frame of a whiteboard; and
if gradual changes are identified in the whiteboard color, determining whether the current whiteboard color model in a whiteboard color model database of all whiteboard color models available should be updated.

21. The computer-implemented process of claim 20 wherein if average cell color is almost the same, but not the same, as in previous frames, further comprising the process actions of:
determining that a gradual lighting change has occurred; and
updating the current whiteboard background color model for the whiteboard background and stroke cells having a whiteboard background color.

22. The computer-implemented process of claim 21 wherein the process action of updating the whiteboard color model for the whiteboard and stroke cells comprises the process actions of:
dividing the image of the whiteboard into cells;
sorting the pixels in each cell according to their luminance value; and
assigning the highest luminance value in each cell as the resulting whiteboard color of that cell.

23. The computer-implemented process of claim 22 further comprising the process action of filtering the colors of the cells comprising the following process actions:
subjecting the resulting cell colors to a least-median-square error procedure, which fits a global plane over the colors and throws away the cells that are foreground cells;
designating the remaining cells as whiteboard background cells;
using said remaining whiteboard background cells to update the whiteboard background;
and filling the holes in the whiteboard color model created by throwing out the cells that were foreground cells with known colors from neighboring cells with whiteboard background colors.

24. The computer-implemented process of claim 22 wherein the cell size should is approximately the same as what the size of a single character on the whiteboard is expected to be.

25. The computer-implemented process of claim 21 wherein the process action of updating the whiteboard color model for the whiteboard and stroke cells comprises the process actions of:
dividing the image of the whiteboard into cells;
sorting the pixels in each cell according to their luminance value; and
averaging the top 10% values of the luminance values in each cell and assigning this value as the resulting whiteboard color of that cell.

26. The computer-implemented process of claim 25 wherein the cell size should is approximately the same as what the size of a single character on the whiteboard is expected to be.

27. The computer-implemented process of claim 21 wherein the process action of updating the whiteboard background color comprises:
taking a greater percentage of the last whiteboard background color model and a smaller percentage of the new whiteboard background color and summing these to obtain a new whiteboard background color.

28. The computer-implemented process of claim 27 wherein the greater percentage of the last whiteboard background color model is 90% and the small percentage of the new whiteboard background color is 10%.

29. The computer-implemented process of claim 1 wherein the process action of determining if there are significant lighting changes in said cells comprises the process action of:
determining if a majority of the cells exhibit a color change and if so designating that a lighting change has occurred.

30. The computer-implemented process of claim 29 wherein as majority is defined as 95% percent of the cells exhibit a color change.

31. A system for streaming whiteboard data content, the system comprising;
a classification module for classifying each cell of a sequence of whiteboard images that are divided into cells, as a stroke cell, a whiteboard background cell or a foreground cell;
a dynamic whiteboard background and initialization module that is used to determine the color of the whiteboard background color in said cells;
an image enhancement module for enhancing images comprised of whiteboard background, foreground and stroke cells; and
a module for adding and erasing whiteboard stroke data for creating images of the whiteboard using whiteboard background and stroke cells.

32. The system of claim 31 further comprising a module for streaming whiteboard image data wherein said whiteboard image data is comprised of whiteboard background cells, foreground cells and stroke cells.

33. The system of claim 31 further comprising a module for streaming whiteboard content data, wherein said whiteboard content data is comprised of whiteboard background cells and stroke cells.

34. The system of claim 31 wherein the module for classifying whiteboard content data comprises sub-modules for:
   for all cells in said sequences of images of a whiteboard, inputting an image frame cell;
      comparing said image frame cell against the image of cells in the same location in previous frames;
      if the cell age is not greater than an age threshold classifying the cell as a foreground cell;
      designating all the cells that have been stationary for more than N frames as background candidates;
      determining if there is any significant difference in cell color and if there is any significant difference in the cell color, classifying the cell as a foreground cell;
      determining whether a cell classified as a foreground cell is connected to other foreground cells;
      if a cell is classified as a foreground cell and not connected to other cells, reverting its classification to unknown;
      determining whether said cell contains edges;
         if said cell does contain edges, classifying said cell as a stroke cell; and
         if said cell does not contain edges, classifying said cell as a whiteboard background cell.

35. The system of claim 31 wherein some but not all images recorded in a video stream of a whiteboard are used to create said sequence of images.

36. The system of claim 31 wherein all images recorded in a video stream of a whiteboard are used to create said sequence of images.

37. A computer-readable medium having computer-executable instructions for transmitting a video stream of a whiteboard, said computer executable instructions comprising:
   inputting a sequence of image frames of a whiteboard;
   dividing each of said image frames of said whiteboard into cells;
   determining if there are significant lighting changes in said cells in said sequence of images;
      if there are significant lighting changes, performing a whiteboard color matching process to determine the color of the whiteboard;
      if there are no significant lighting changes, classifying each of the cells of the image frames as foreground, whiteboard background or stroke cells of content written on the whiteboard;
   enhancing the sequence of image frames so that only the strokes on the whiteboard are displayed in an enhanced manner using said cell classification.

38. The computer-readable medium of claim 37 further comprising a computer-executable instruction for outputting said enhanced sequence of images using only said whiteboard background and stroke cells.

39. The computer-readable medium of claim 37 further comprising a computer-executable instruction for outputting said enhanced sequence of images using only said whiteboard background, foreground cells and stroke cells.

40. A system for transmitting a video stream of enhanced whiteboard images, the system comprising:
   a sender, comprising,
      an input module for inputting a sequence of captured whiteboard images and audio synchronized with said sequence of captured whiteboard images, and dividing each of said images into cells;
      a classification module for classifying whiteboard image data as stroke cells, whiteboard background cells or foreground cells;
      a dynamic whiteboard background and initialization module;
      an image enhancement module fore enhancing strokes in said stroke cells and making whiteboard background cell color more uniform; and
      a module for adding and erasing whiteboard stroke data;
      an transmission module that transmits a first data stream of enhanced whiteboard images that include foreground objects using said foreground cells, whiteboard background cells and said stroke cells, and a second data stream of enhanced whiteboard images that do not include foreground objects, using said stroke cells and whiteboard background cells but no foreground cells to a receiver over a network.

41. The system of claim 40, further comprising a receiver, said receiver comprising:
   a receiving module that receives said enhanced whiteboard images and synchronized audio sent from said sender over said network;
   a speaker module that plays said synchronized audio; and
   a display module that displays said enhanced whiteboard images at the receiver.

42. The system of claim 41, wherein said receiver, further comprises a module for selecting which of the first data stream or the second data stream said receiver wants to display on said display module.

43. The system of claim 41, wherein said receiver, further comprises a module for sending annotations to said whiteboard data stream back to said sender.

44. The system of claim 43, wherein said sender displays said annotations sent by said receiver on said whiteboard by superimposing said annotations on said whiteboard by projecting said annotations onto said whiteboard with a projector.

45. The system of claim 43, wherein said sender displays said annotations on said whiteboard by superimposing said annotations on said whiteboard on a separate display, wherein both said whiteboard image and said annotations are displayed.

46. The system of claim 40 wherein said sender further comprises a module for archiving said first and second data streams for later viewing or transmission.

47. The system of claim 40 wherein said dynamic whiteboard background estimation and initialization module, estimates whiteboard color by: for a first input image,
   initializing whiteboard background color for each pixel, and associating each pixel with a co variance estimate that characterizes the accuracy of said pixel color, designating the initialized whiteboard color as the estimated whiteboard color;
   given an input image, comparing estimated color of the whiteboard and the actual observed color in said input image at each pixel, and
   if the estimated color and the observed color are very different, the observed pixel is a part of either a stroke or a foreground object, and the color of that pixel is discarded,
   otherwise, the color of that pixel is an observation of the whiteboard color, to be used in updating the whiteboard color; and
   updating the color of those pixels that were not discarded under a probabilistic framework, wherein each pixel is modified based on how reliable the current observed pixel is with respect to the estimated color, how different the current observed pixel is from the estimated color, and how different the observed color of the pixel is from the colors in the neighboring pixels.

48. The system of claim 47 wherein the co variance matrix of the color estimate at each pixel is also updated when the pixel colors are updated.

49. The system of claim 47 wherein said dynamic whiteboard background estimation and initialization module, estimates whiteboard color by:
   for a subsequently input image after said first input image,
      comparing the updated estimated color of the whiteboard and the actual observed color in said input image at each pixel, and
      if the updated estimated color and the observed color are very different, the observed pixel is a part of either a stroke or a foreground object, and the color of that pixel will be discarded;
      otherwise, the color of that pixel is an observation of the whiteboard color, to be used in updating the whiteboard color; and
   updating the color of those pixels that were not discarded under a probabilistic framework, wherein each pixel is modified based on how reliable the current observed pixel is with respect to the estimated color, how different the current observed pixel is from the estimated color, and how different the observed color of the pixel is from the colors in the neighboring pixels.

50. The system of claim 40 wherein said dynamic whiteboard background estimation and initialization module, estimates whiteboard color by:
   for a first input image,
      dividing a whiteboard into cells;
      initializing whiteboard background color for each cell, and associating each cell with a co variance estimate that characterizes the accuracy of said cell color, designating the initialized whiteboard color as the estimated whiteboard color;
      given an input image, comparing estimated color of the whiteboard and the actual observed color in said input image at each cell, and
      if the estimated color and the observed color are very different, the observed cell is a part of either a stroke or a foreground object, and the color of that cell is discarded;
      otherwise, the color of that cell is an observation of the whiteboard color, to be used in updating the whiteboard color; and
   updating the color of those cells that were not discarded under a probabilistic framework, wherein each cell is modified based on how reliable the current observed cell is with respect to the estimated color, how different the current observed cell is from the estimated color, and how different the observed color of the cell is from the colors in the neighboring cells.

51. The system of claim 50 wherein the co variance matrix of the color estimate at each cell is also updated when the cell colors are updated.

52. The system of claim 50 wherein said dynamic whiteboard background estimation and initialization module, estimates whiteboard color by:
   for a subsequently input image after said first input image,
      comparing the updated estimated color of the whiteboard and the actual observed color in said input image at each cell, and
      if the updated estimated color and the observed color are very different, the observed cell is a part of either a stroke or a foreground object, and the color of that cell will be discarded;
      otherwise, the color of that cell is an observation of the whiteboard color, to be used in updating the whiteboard color; and
   updating the color of those cells that were not discarded under a probabilistic framework, wherein each cell is modified based on how reliable the current observed cell is with respect to the estimated color, how different the current observed cell is from the estimated color, and how different the observed color of the cell is from the colors in the neighboring cells.

53. A computer-implemented process for estimating whiteboard color dynamically from a sequence of images in real time, comprising the process actions of:
   defining the state variable $x_{i,j}$ as the color of the whiteboard at each cell $(i, j)$ to be estimated, and the observation variable $z_{i,j}$ as the color of the whiteboard at each cell $(i;j)$ observed from an image;
   calculating the color in each cell as, $$x_{i,j}^t = (\hat{P}_{i,j}^{t|t-1})^{-1} + (Q_{i,j}^t)^{-1} + (S_{i,j}^t)^{-1})^{-1} (\hat{P}_{i,j}^{t|t-1})^{-1}$$
$$\hat{x}_{i,j}^{t|t-1} + (Q_{i,j}^t)^{-1} z_{i,j}^t + (S_{i,j}^t)^{-1} \bar{x}_{i,j}^t$$

where for a first iteration, the mean of the predictions is used $$\frac{1}{\Omega} \sum_{(k,l) \neq (i,j)} x_{k,l}^{t|t-1}$$

as $\bar{x}_{i,j}^t$ where $\Omega$ is the number of neighboring cells, $k \in [i-1, i+1]$, $l \in [j-1, j+1]$, $(k,l) \neq (i,j)$, and in subsequent iterations, the mean of the estimates from the previous iteration are used; and wherein the co variance of $x_{i,j}^t$ is given by $$P_{i,j}^t = ((\hat{P}_{i,j}^{t|t-1})^{-1} + (Q_{i,j}^t)^{-1} + (S_{i,j}^t)^{-1})^{-1})(2I + (S_{i,j}^t)^{-1} \bar{P}_{i,j}^t)$$

where I is the identity matrix, and $$\bar{P}_{i,j}^t = \frac{1}{\Omega} \sum_{(k,l) \neq (i,j)} P_{k,l}^t$$

and the mean of the predictions, $$\frac{1}{\Omega} \sum_{(k,l) \neq (i,j)} \hat{P}_{k,l}^{t|t-1}$$

is used as $\bar{P}_{i,j}^t$ in the first iteration, and where the observation co variance is $Q_{i,j}^t$, the smoothness co variance matrix is $S_{i,j}^t$, the state transition noise is $\eta_{i,j}^t$ and its covariance matrix is $R_{i,j}^t$.

* * * * *